(12) United States Patent
Lu

(10) Patent No.: US 7,106,337 B2
(45) Date of Patent: Sep. 12, 2006

(54) PORTABLE DIGITAL GRAPHIC PROCESSING DEVICE

(75) Inventor: Mei Yueh Lu, Taipei (TW)

(73) Assignee: Power Quotient International Co., Ltd., Taipei Hsien (TW)

( * ) Notice: Subject to any disclaimer, the term of this patent is extended or adjusted under 35 U.S.C. 154(b) by 0 days.

(21) Appl. No.: 10/770,411

(22) Filed: Feb. 4, 2004

(65) Prior Publication Data

US 2005/0133604 A1  Jun. 23, 2005

(30) Foreign Application Priority Data

Dec. 19, 2003  (TW)  ............................... 92222221 U

(51) Int. Cl.
*G06T 1/60*  (2006.01)
(52) U.S. Cl. ...................... 345/536; 345/531; 345/554; 235/492

(58) Field of Classification Search ................ 235/492; 345/530, 531, 532, 554, 536
See application file for complete search history.

(56) References Cited

U.S. PATENT DOCUMENTS 5,664,162 A * 9/1997 Dye ........................... 345/532
2005/0062858 A1* 3/2005 Kouramanis et al. .... 348/231.3

* cited by examiner

*Primary Examiner*—Ahshik Kim
*Assistant Examiner*—Daniel A. Hess
(74) *Attorney, Agent, or Firm*—Troxell Law Office, PLLC

(57) ABSTRACT

The present invention discloses a portable digital graphic processing device having the required graphic processing capability by adopting the advanced multi-chip packaging technology and intelligent stick memory card packaging technology to integrate the graphic processing function into an intelligent stick for the portable purpose and integrate a portable device such as a PDA or a smart phone to enhance the digital graphic processing capability of portable devices.

4 Claims, 2 Drawing Sheets

| 1 | $V_{BUS}$ | 6  | DAT#1 |
|---|-----------|----|-------|
| 2 | D-        | 7  | DAT#2 |
| 3 | D+        | 8  | CLK   |
| 4 | GND       | 9  | DAT#3 |
| 5 | DAT#0     | 10 | CMD   |

PORTABLE DIGITAL GRAPHIC PROCESSING DEVICE

FIELD OF THE INVENTION

The present invention relates to a portable digital graphic processing device, more particularly to a handheld device such as a PDA, a mobile phone, a smart phone, a MPEG player, or a palm-type game player that enhances the 3D graphic processing capability and offers a choice of better convenience to users, which is also the trend of the 3D graphic products.

BACKGROUND OF THE INVENTION

Portable devices generally focus on a light, thin, short, and compact design; such design cannot provide a high-speed processing capability for graphic processing. Unlike personal computers, the graphic processing capability such as the 3D animation for portable devices cannot be enhanced to a high-speed data processing capability for users.

Therefore, the way of overcoming the foregoing shortcomings by providing digital data processing equipments compatible to the existing computer interface to make its application more convenient and comply with user's operating habits is an important subject that deserves our attention.

In view of the description above, the inventor of this invention based on years of experience in the research and development and marketing of related computer products to conduct researches and perform experiments to overcome the foregoing shortcomings, and finally invented the "portable digital graphic processing device" in accordance with the present invention.

SUMMARY OF THE INVENTION

The present invention discloses a portable digital graphic processing device having the required graphic processing capability by adopting the advanced multi-chip packaging technology and intelligent stick memory card packaging technology to integrate the graphic processing function into an intelligent stick for the portable purpose and integrate a portable device such as a PDA or a smart phone to enhance the digital graphic processing capability of portable devices.

DETAILED DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
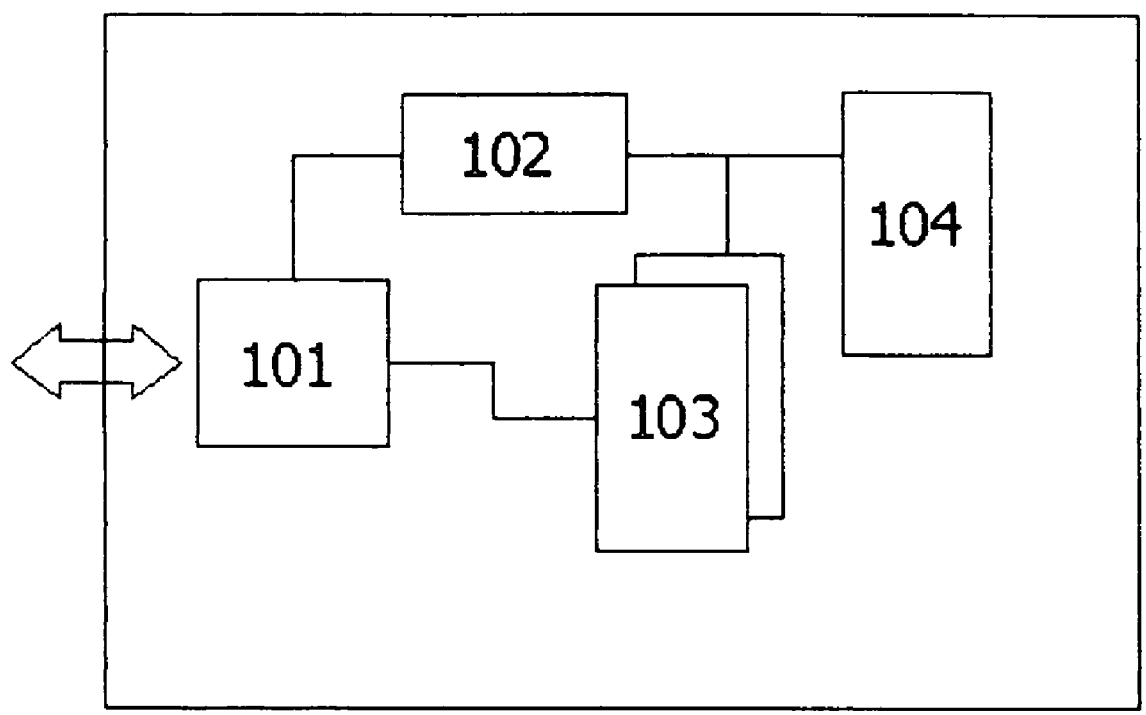
FIG. 1 is a system block diagram of the portable digital graphic processing device of the present invention.

Please refer to FIG. 1 for the system block diagram of the present invention, which comprises an interface controller 101 for transmitting graphic data and providing the connection between this device and a portable device such as a PDA and a smart phone, a high-speed graphic processing unit 102 having a graphic data processing capability, and a high-speed memory 104 required for the operation of the high-speed graphic processing unit 102. Since the high-speed memory 104 is used in the graphic processing according to this embodiment, therefore such memory 104 is also called a graphic memory, which could be a high-speed volatile memory such as a SDRAM or a SRAM. If this memory capacity is not large, the graphic memory can be integrated into the graphic data processor having a high-speed memory unit. A 3D graphic database 103 could be included in a non-volatile flash memory, and the required 3D graphic data can be downloaded via the interface controller 101 and a computer connection or preloaded into a chip by the mask ROM technology by chip manufacturers as the data and parameter used in the operation of the high-speed graphic processing unit 102.

If an advanced semiconductor packaging technology is used, the foregoing volatile memory and non-volatile memory can be packaged as a module. A multi-chip packaging technology is generally used to integrate memories with different specifications including memory capacity, access time, and data bandwidth into a single chip as shown in the block diagram of FIG. 1.

Most products adopting the multi-chip packaging technology are used only for voice processing such as voice download and sound effect processing, etc, but the 3D graphic processing and virtual reality graphic effects can be applied to portable devices, while the system design disclosed in this invention and the graphic processing capability are included. Different portable equipments and their requirements for graphic processing will determine the appropriate memory specification and type such as a DRAM, SDRAM, SRAM, or MDRAM (Multi-bank DRAM), etc to combine with a non-volatile memory such as an EPROM, EEPROM, Mask ROM, flash memory, FRAM, or MRAM, etc. Any combination of the foregoing packaged types of memory chips is applicable to the portable device of this invention, wherein the SGRAM, VRAM, WRAM, or MDRAM specially designed for graphic processing has a higher performance but also a higher cost.

Further, since this device must be connected to a personal computer (PC) to download graphic data, and also connected to a portable device, therefore the interface controller 101 can be designed as a dual interface controller such as the USB interface and MMC interface. The former can be connected to a computer platform via a USB bus, and the latter can be used to connect to a portable device such as a PDA or a mobile phone. If it is necessary to expedite and enhance the graphic data processing capability for a smart phone or a game player, etc, a graphic signal processing device according to this invention can be installed to expedite the graphic processing or enhance the 3D graphic virtual reality display. The most appropriate product and general design sold in the market that goes with this invention is a USB interface intelligent stick. However, the general intelligent stick sold in the market only comes with a 4-pin USB interface, and the rest of the pins are not used. Therefore the rest of the pins can be used to design a second 6-pin interface for connecting to a portable device, which can easily accomplish the foregoing dual interface graphic processing intelligent stick.

Figure 2:
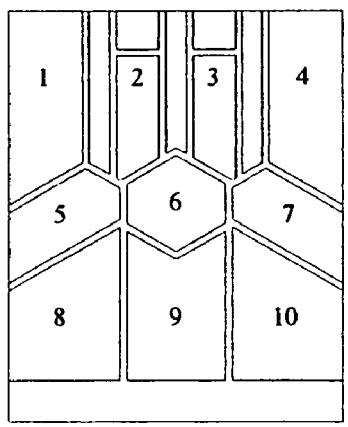
FIG. 2 is an illustrative diagram of the interface layout of the intelligent stick according to the present invention.

Please refer to FIG. 2 for the interface layout of the intelligent stick. In this invention, Pins 1 to 4 are used for the USB interface signal layout, and Pins 5 to 10 are used for the second interface, and thus constituting a dual interface intelligent stick having the graphic processing capacity.

Such dual interface layout is exposed to the outside for the signal connection. If it is necessary to connect the intelligent stick to a computer system, a USB cable can be used. If it is necessary to connect a portable device to enhance the graphic processing, a low-power second interface can be used as shown in the figure. This invention adopts a design of 4-bit transmission bandwidth to improve the data transmission speed. Of course, a 1-bit low-speed transmission bandwidth can be used to facilitate the system design of the portable device in order to achieve the low power consumption and long idling time requirements. However, this dual interface cannot work for two or more different devices or systems at the same time.

Figure 3:
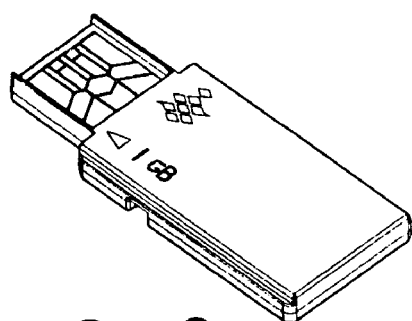
FIG. 3 is a perspective diagram of the portable digital graphic processing device of the present invention.

Please refer to FIG. 3 for the perspective view of the device according to the present invention. The design and method disclosed in this invention greatly enhance the graphic data processing capability for portable devices. Further, this invention adopts the intelligent stick for the design, therefore it provides a variety of choices for the user's graphic processing requirements, and attains the purpose of providing a portable device with a flexible equipment design of personal computers.

In summation of the above description, the present invention enhances the performance of the conventional structure, and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable digital graphic processing device for use with an external device comprising:
   a) an dual interface controller providing an interface signal and serving as a interface channel for the external device to transmit data;
   b) a first memory module having at least one non-volatile memory and storing digital data;
   c) a second memory module having at least one non-volatile memory and storing digital data;
   d) a data processing unit connected with th dual interface controller by a semiconductor circuit design providing a digital graphic data processing and computation capability;
   e) a carrier, the dual interface controller, the first memory module, the second memory module, data processing unit, and a dual interface circuit layout are located in the carrier; and
   f) the dual interface circuit layout including a first circuit and a second circuit, the first circuit including four pins spaced apart, the second circuit including six pins spaced apart, the six pins are located between the four pins and the carrier;

wherein the dual interface controller and the first memory module are connected to the data processing unit by the first circuit for selectively writing data to and reading data from the first memory module, the dual interface controller and the second memory module are connected to the data processing unit by the second circuit for selectively writing data to and reading data from the second memory module, the dual interface controller transmitting data to the data processing unit for data processing, the dual interface controller transmitting processed data to the external device expediting and enhancing a graphic data processing capability of a system of the external device.

2. The portable digital graphic processing device according to claim 1, wherein the second memory module is integrated into the data processing unit utilizing a semiconductor technology.

3. The portable digital graphic processing device according to claim 1, wherein the first memory module is integrated into the data processing unit utilizing a semiconductor technology.

4. The portable digital graphic processing device according to claim 1, wherein the four pins of the first circuit have a USB interface layout and include at least one USB interface signal.

* * * * *